Patented Jan. 7, 1947

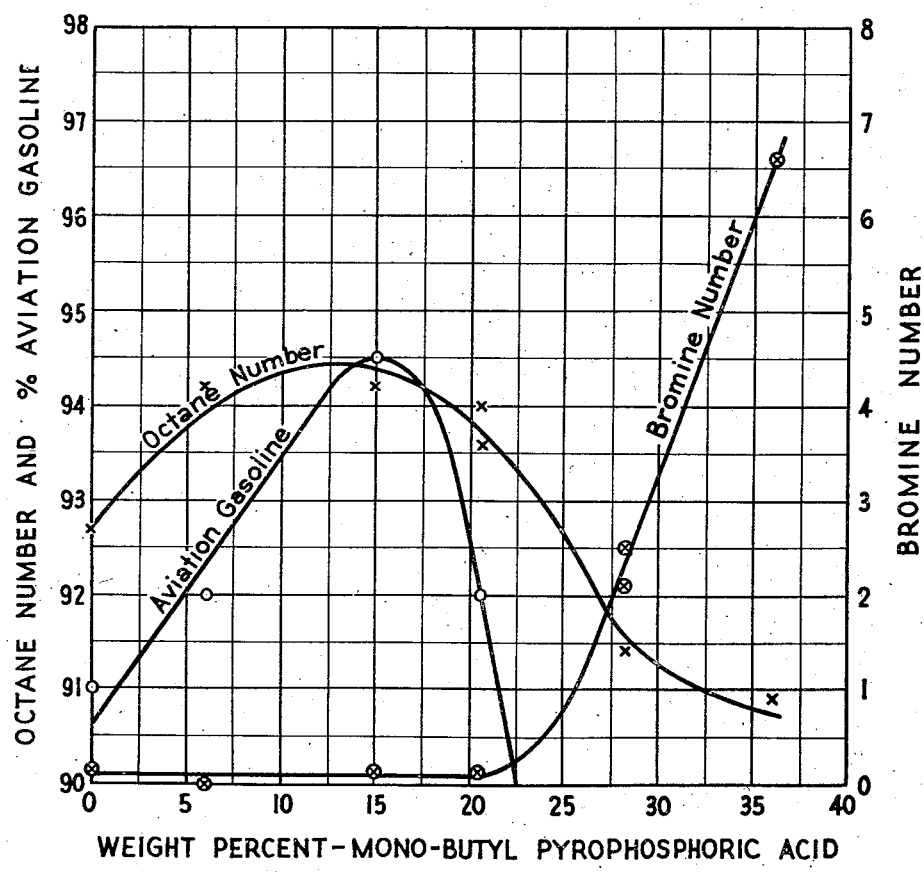

2,413,777

UNITED STATES PATENT OFFICE 2,413,777

HYDROCARBON CONVERSION

Eugene H. Oakley, El Cerrito, and Lloyd F. Brooke, Berkeley, Calif., assignors, by mesne assignments, to California Research Corporation, San Francisco, Calif., a corporation of Delaware Application April 7, 1941, Serial No. 387,142

19 Claims. (Cl. 260—683.4)

This invention pertains to the production of paraffin hydrocarbons by the reaction of lower boiling isoparaffins with olefins in the presence of an alkylation catalyst, and more particularly to the production of isoparaffins of high antiknock value boiling in the gasoline range by means of a compound acidic alkylation catalyst.

This application is a continuation-in-part of our copending application Serial No. 275,459, filed May 24, 1939.

The alkylation of isoparaffins, such as isobutane, by normally gaseous olefins, such as the butenes, in the presence of a concentrated sulfuric acid catalyst for the production of saturated motor fuels of high antiknock value has been disclosed in British Patent No. 479,827. The alkylation product has been called "alkylate" or "alkymer" in order to distinguish it from a "polymer." The sulfuric acid therein employed may contain from 90 to 100% $H_2SO_4$ and 10 to 0% water while the temperature disclosed is from 14° to 86° F. Practical experience has shown, however, that when the acid is employed at a concentration below about 95% $H_2SO_4$, i. e., containing more than about 5% of water, the alkylation effected is less desirable than when acid of 95 to 100% $H_2SO_4$ is used. On the other hand, acid in this higher range of concentrations has been found to oxidize and polymerize a portion of the reactants to terpene-like resinous materials which accumulate in the acid and ultimately render it inactive as a catalyst for further alkylation.

It is the object of the present invention to provide a class of compounded alkylation catalysts which are not attended by the foregoing disadvantages.

It is a further object of the present invention to provide a combination catalyst for the alkylation of isoparaffins containing a tertiary carbon atom by means of olefins, which is possessed of the alkylating efficacy of concentrated sulfuric acid but is free from the disadvantages of the latter.

It is a specific object of the invention to provide a compounded liquid acid catalyst for the alkylation of isoparaffins by olefins at temperatures higher than may be used with the same reactants when concentrated sulfuric acid is employed as the alkylating catalyst.

It is a more specific object of this invention to provide a liquid acid catalyst for the alkylation of isoparaffins by olefins at temperatures between about 14° and 150° F.

It is a further object of this invention to provide a process for the alkylation of isoparaffins by isoolefins in which an acidic alkylation catalyst is employed that is less susceptible of deterioration than is concentrated sulfuric acid under the same conditions.

It is a more specific object of the present invention to provide a process for the alkylation of isobutane or isopentane by the normally gaseous olefins for the production of isoparaffinic motor fuels of high antiknock value by means of a novel class of modified sulfuric acid catalysts.

It is a still more specific object of the invention to provide a process for the alkylation of isobutane by isobutene to produce a liquid motor fuel consisting predominantly of isooctane by means of a sulfuric acid alkylation catalyst compounded with a specific auxiliary agent.

Other specific objects of the present invention will be apparent from the following description and discussion and the appended claims.

The attached drawing illustrates graphically certain features of the invention.

We have discovered that the above objects may be substantially realized through the use of a liquid catalyst, such as sulfuric acid, of a concentration that would normally tend to oxidize and polymerize the hydrocarbons involved in the alkylation reaction when it is compounded and diluted with a nonaqueous agent miscible in the sulfuric acid and having the effect of reducing the tendency of the sulfuric acid to oxidize and polymerize the reactants involved in the alkylation reaction with substantially no impairment of its effectiveness to bring about the desired alkylation reaction.

When, as above indicated, 100% sulfuric acid is diluted with as much as 10% of water, its ability to catalyze the alkylation of isoparaffins with olefins is substantially impaired. This is apparently due to formation by the acid molecules of stable hydrates which are incapable of activating the alkylation reactants. Whatever may be the explanation of how dilution of the sulfuric acid with water interferes with its alkylating effectiveness, the significant fact is that it has been found impossible to reduce the tendency of concentrated sulfuric acid to oxidize the hydrocarbons involved in an alkylation reaction, in which sulfuric acid is the catalyst, by diluting it with water without at the same time lowering its effectiveness as an alkylation catalyst substantially below the point of minimum practical value.

We have now discovered that when such concentrated sulfuric acid is compounded with and diluted by the organic compounds of the oxy-acids of phosphorus the tendency of the sulfuric acid to produce undesirable oxidation and undesirable polymerization of the reacting hydrocarbons may be materially reduced while its ability to promote the alkylation reaction remains substantially unimpaired. These compounds resemble sulfuric acid and have as their characteristic or central atom the acid-forming element phosphorus and should be neither strong oxidizing nor strong reducing agents in sulfuric acid solution. Moreover, they should not be too readily volatilized from solution in sulfuric acid at temperatures which are appropriate for the alkylation reaction. These organic compounds of the oxy-acids of phosphorus include the organic compounds of ortho-, hypo-, meta- and pyrophosphoric acids and of the phosphorous acids, such as the alkyl derivatives of the oxy-acids of phosphorus including the alkyl phosphates and phosphites.

According to one preferred embodiment of the present invention pyrophosphoric acid is mixed with sulfuric acid of 100% $H_2SO_4$ concentration in amount sufficient to dilute or otherwise alter the sulfuric acid to a point such that it no longer exerts its usual strong oxidizing action on substances involved in the alkylation reaction at temperatures consistent with the alkylation desired. For instance, it has been found that pyrophosphoric acid may be admixed with sulfuric acid to the extent of about 20% by weight without substantially decreasing the alkylating efficacy of the sulfuric acid while at the same time producing a superior catalyst for alkylating isoparaffins with olefins. The pyrophosphoric acid combines at once with a portion of the olefin producing the corresponding mono-alkyl ester which then constitutes the actual compounding agent.

In a still more specific embodiment of the invention monobutyl pyrophosphate is incorporated in 100% $H_2SO_4$ to the extent of about 25% by weight with similarly desirable results.

In some instances, as in the case of orthophosphoric acid mixtures with sulfuric acid, the normally gaseous olefins do not react to form the alkyl phosphoric acids under the mild conditions of the alkylation reaction. It may thus be desirable to prepare the alkyl phosphoric acids under more appropriate conditions and to add it as such in forming the sulfuric acid compounded catalyst.

The particular advantages that have been found to reside in the compounded sulfuric acid alkylation catalysts of the present invention include a substantial increase in the active life of the catalyst, an extension of the temperature range in which it is active without serious attack on the hydrocarbon constituents of the reaction and an improvement in the octane number and the aviation gasoline content of the alkylate product produced, and while particular compounded sulfuric acid alkylation catalysts, according to this invention, may have specific advantages in effecting the alkylation of certain particular combinations of isoparaffins and olefins, in general it will be found that they may be used with the isoparaffins and olefins of low molecular weight at from 15 to 100° F. higher temperature than is possible when using concentrated sulfuric acid alone as the catalyst.

By way of illustration of the more specific advantages of the acid catalysts compounded according to the present invention, we have found that the mono-butyl pyrophosphates, and particularly mono-tertiary-butyl pyrophosphate, alone or in admixture with varying quantities of the corresponding secondary compound, are especially advantageous compounding agents for producing a catalyst for the alkylation of isobutane with isobutene. It has previously been found that in the alkylation of isobutane with isobutene by means of concentrated sulfuric acid as the catalyst the alkylate product produced is several units lower in octane number than is the alkylate resulting from isobutane and normal butene under substantially the same conditions. It is also a fact that strong sulfuric acid loses its catalytic activity for alkylating isobutane with isobutene or butene mixtures rich in isobutene, far more rapidly than when alkylating isobutane with normal butene. When, however, isobutane is alkylated with isobutene by means of a catalyst composed of sulfuric acid and up to about 25% of butyl pyrophosphate, the octane number of the resulting alkylate is from one to two units higher than when produced by means of a straight sulfuric acid catalyst and approaches the octane number of the normal butene product. The active life of such a compounded sulfuric acid catalyst is also substantially longer in the alkylation of isobutane with isobutene than has been realized with the conventional concentrated sulfuric acid catalysts in this service.

When the alkyl esters of the oxy-acids of phosphorus previously mentioned are employed as diluents or compounding agents in concentrated sulfuric acid for the production of alkylation catalysts according to the present invention, the resulting catalysts may be employed for the alkylation of isoparaffins by olefins in the temperature range from about 14° to about 150° F., and under sufficient pressure to maintain the reactants substantially in liquid phase, with results which are substantially superior to those that have been obtained with concentrated sulfuric acid alone as the catalyst. The alkylation product is in general of higher octane number, the aviation gasoline content thereof is higher and the active life of the catalyst is substantially longer.

The principle of our invention may be further illustrated by the following example in which isobutane was alkylated by n-butene by means of a compound sulfuric acid alkylation catalyst.

*Example.*—A catalyst containing 85.5% $H_2SO_4$ and 16.3% pyrophosphoric acid was employed for the alkylation of a hydrocarbon mixture containing 67.5% isobutane, 17.8% normal butenes, 14.7% normal butane and propane at 30° F. and under sufficient pressure for liquid phase operation. The hydrocarbon mixture was added to the vigorously-stirred liquid acid catalyst at a rate of about 0.6 volume of the liquid hydrocarbon per volume of catalyst per hour. It was found that no alkylation took place until sufficient butene had been absorbed to convert the pyrophosphoric acid to mono-butyl pyrophosphoric acid, after which the alkylation reaction proceeded smoothly to give an alkylate product containing 100% aviation gasoline having an octane number of 94.7.

A series of experiments was performed on the alkylation of isobutane with isobutene by means of a sulfuric acid catalyst compounded with varying proportions of mono-tertiary-butyl pyrophosphate. The data resulting from these experiments are recorded in the following table:

*Alkylation of isobutane with isobutene*

| Run No. | III-1 | III-171 | III-198 | II-279 | III-175 | III-169 |
|---|---|---|---|---|---|---|
| Catalyst, wt. percent: | | | | | | |
| 100 percent $H_2SO_4$ | 100 | 94.0 | 85.0 | 79.4 | 71.8 | 64.0 |
| Butyl pyrophosphoric acid | | 6.0 | 15.0 | 20.6 | 28.2 | 36.0 |
| Feed stock, wt. percent: | | | | | | |
| Isobutane | 70.0 | 69.1 | 72.0 | 71.0 | 69.1 | 69.1 |
| Isobutene | 17.6 | 17.8 | 17.5 | 17.0 | 17.8 | 17.8 |
| n-Butane and propane | 12.4 | 13.1 | 11.5 | 12.0 | 13.1 | 13.1 |
| Operating conditions: | | | | | | |
| Temperature, °F | 40–45 | 40–45 | 40–45 | 40–45 | 40–45 | 40–45 |
| Pressure | Sufficient pressure to give liquid phase operation | | | | | |
| Olefin rate, liq. v./v./hr | 0.1 | 0.1 | 0.1 | 0.1 | 0.1 | 0.1 |
| Product: | | | | | | |
| Yield, wt. percent olefin chg | 168 | 177 | 169 | 192 | 169 | 151 |
| Gravity, A. P. I | 67.1 | 68.6 | 68.6 | 68.7 | 66.8 | 65.4 |
| Bromide No | .1 | .0 | .1 | .1 | 2.5 | 8.7 |
| Percent avn. gaso. (275° F. @ 90 percent) | 91 | 92 | 94.5 | 92 | 75 | 67 |
| Octane No | 92.7 | 94.2 | 94.2 | 94.0 | 91.4 | 91.4 |

The catalysts in these experiments were prepared by making the appropriate mixture of sulfuric and pyrophosphoric acids and then absorbing isobutene in the mixture until no more was taken up. This point corresponded to the production of a mono-butyl pyrophosphoric acid which was largely the tertiary compound. The range of catalyst compositions giving improved results over unmodified sulfuric acid and the magnitude of the improvement is shown graphically in the figure of the attached drawing. It will be noted that for the alkylation of isobutane by isobutene with sulfuric acid catalyst compounded with mono-tertiary-butyl pyrophosphoric acid an improved product with respect to octane number, aviation gasoline content and saturation (low bromine number) is indicated for proportions of the pyrophosphoric acid ester up to about 25% by weight in 100% $H_2SO_4$.

While in the foregoing examples the hydrocarbon reaction mixture was continuously added to the stirred acid catalyst and the product was allowed to accumulate in the reaction vessel, operation of the process of our invention may be in various other ways as, for instance, by a strictly continuous, a semicontinuous or a strictly batch method, the details of operation being susceptible of considerable variation depending upon the specific combination of isoparaffin and olefin being alkylated and the particular compounding agent employed in the catalyst. For instance, in a simple continuous operation employing a liquid acid catalyst of the class described such as one of those specifically described in the foregoing example and experiments, the hydrocarbon mixture may be circulated together with the acid catalyst through an appropriate contacting device into a settling chamber from which the acid catalyst layer is separated from the hydrocarbon layer to be recirculated to the reaction zone for further use until its catalytic power becomes exhausted. The separated hydrocarbon phase containing unreacted isoparaffin and alkylate product may be handled by conventional means for recovery of the product while the excess isoparaffin is recycled to the reaction zone.

In addition to the higher octane number, higher aviation gasoline content and higher degree of saturation of the product that may be realized through use of the modified sulfuric acid catalyst of the present invention, it has also been found that the active life of the compounded catalyst is substantially longer than is that of the usual concentrated sulfuric acid catalyst under the same conditions of operation. This is in all probability due to the suppression of oxidation-polymerization reactions leading to the formation of resinous or tarry products which tend to poison the sulfuric acid. A further advantage of the modified sulfuric acid alkylation catalysts of the present invention is to be found in the fact that they may be employed at substantially higher temperatures without producing the undesirable side reactions which would result with an unmodified sulfuric acid catalyst.

In effecting the alkylation of isoparaffins by olefins with the compounded sulfuric acid catalysts of the present invention, it has been found desirable to maintain the molecular ratio of isoparaffin to olefin at the point at which the olefin first contacts the catalyst at a relatively high value as, for instance, above about 10 to 1 and frequently as high as 50 to 1 or above, with ratios as high as 800–1000 to 1 being possible and sometimes desirable, while the concentration of the isoparaffin in the hydrocarbon phase is maintained above about 50% and the molecular ratio of isoparaffin to alkyl acid sulfate above at least about 10 to 1 throughout the reaction zone.

While the foregoing examples show the alkylation reaction to proceed satisfactorily under sufficient pressure to keep both the isoparaffin and olefin in the liquid phase, and that is the usually preferred method of operation, it may be under certain conditions more desirable to employ one or both of the hydrocarbon reactants in gas phase.

Although the use of our compounded acid alkylation catalysts has been exemplified by the alkylation of an isoparaffinic hydrocarbon with an olefinic hydrocarbon for the production of hydrocarbons useful in motor fuels, the mild and easily controlled activity of these catalysts render them useful also in effecting other alkylating reactions, such as for instance, in the alkylation of isoparaffins by olefins for the production of hydrocarbons boiling above the motor fuel range, due to the fact that less oxidation, polymerization and other undesirable side reactions are produced than with other known alkylation catalysts.

The proportion of diluting or compounding agent, such as pyrophosphoric acid or an alkyl ester of pyrophosphoric acid employed will usually be the minimum required to reduce to the desired degree the oxidation and polymerization action of the sulfuric acid at any given reaction temperature. This amount will in general increase with the temperature of the reaction.

Although the organic compounds of oxy-acids of phosphorus as disclosed above are preferred for use with sulfuric acid in accordance with this invention, other compounds which will be found useful for compounding with and diluting concentrated sulfuric acid for the purpose of this invention are selenious acid, arsenious acid, arsenic acid, boric acid, aryl and chlor-substituted aryl sulfonic and phosphoric acids, such as the chlor-substituted benzene or naphthalene sulfonic and phosphoric acids, etc., phosphorous trichloride and liquid sulfur dioxide.

Having now fully explained and exemplified the process of our invention in which an alkylation catalyst comprising strong sulfuric acid and a compounding agent capable of diluting the sulfuric acid and cooperating with it to produce a catalyst of reduced oxidizing and polymerizing action on the reactants in an alkylation reaction without substantially reduced catalytic power for effecting the alkylation of isoparaffins by olefins and particularly isoparaffins of four or five carbon atoms with the normally gaseous olefins for the production of paraffinic motor fuels of especially high antiknock value, we claim as our invention:

1. Process of producing alkylate from isoparaffinic hydrocarbons and olefinic hydrocarbons which comprises alkylating an isoparaffinic hydrocarbon with an olefinic hydrocarbon by means of a catalyst comprising concentrated sulfuric acid and an alkyl phosphoric acid in amount sufficient to materially alter the catalytic activity of the sulfuric acid in the direction of producing alkylate of higher octane number.

2. Process of producing alkylate from isoparaffinic hydrocarbons and olefinic hydrocarbons which comprises alkylating an isoparaffinic hydrocarbon with an olefinic hydrocarbon by means of a catalyst comprising concentrated sulfuric acid and an alkyl pyrophosphoric acid in amount sufficient to materially alter the catalytic activity of the sulfuric acid in the direction of producing alkylate of higher octane number.

3. Process of producing alkylate from isoparaffinic hydrocarbons and olefinic hydrocarbons which comprises alkylating an isoparaffinic hydrocarbon with an olefinic hydrocarbon by means of a catalyst comprising concentrated sulfuric acid and a butyl phosphoric acid in amount sufficient to materially alter the catalytic activity of the sulfuric acid in the direction of producing alkylate of higher octane number.

4. Process of producing alkylate from isoparaffinic hydrocarbons and olefinic hydrocarbons which comprises alkylating an isoparaffinic hydrocarbon with an olefinic hydrocarbon by means of a catalyst comprising concentrated sulfuric acid and a butyl pyrophosphoric acid in amount sufficient to materially alter the catalytic activity of the sulfuric acid in the direction of producing alkylate of higher octane number.

5. Process of producing alkylate from isoparaffinic hydrocarbons and olefinic hydrocarbons which comprises alkylating an isoparaffinic hydrocarbon with an olefinic hydrocarbon by means of a catalyst comprising concentrated sulfuric acid and a tertiary butyl phosphoric acid in amount sufficient to materially alter the catalytic activity of the sulfuric acid in the direction of producing alkylate of higher octane number.

6. Process of producing alkylate from isoparaffinic hydrocarbons and olefinic hydrocarbons which comprises alkylating an isoparaffinic hydrocarbon with an olefinic hydrocarbon by means of a catalyst comprising concentrated sulfuric acid and a tertiary butyl pyrophosphoric acid in amount sufficient to materially alter the catalytic activity of the sulfuric acid in the direction of producing alkylate of higher octane number.

7. Process of producing alkylate from isoparaffinic hydrocarbons and olefinic hydrocarbons which comprises alkylating an isoparaffinic hydrocarbon with an olefinic hydrocarbon by means of a catalyst comprising concentrated sulfuric acid and a mono-tertiary butyl phosphoric acid in amount sufficient to materially alter the catalytic activity of the sulfuric acid in the direction of producing alkylate of higher octane number.

8. Process of producing alkylate from isoparaffinic hydrocarbons and olefinic hydrocarbons which comprises alkylating an isoparaffinic hydrocarbon with an olefinic hydrocarbon by means of a catalyst comprising concentrated sulfuric acid and a mono-tertiary butyl pyrophosphoric acid in amount sufficient to materially alter the catalytic activity of the sulfuric acid in the direction of producing alkylate of higher octane number.

9. Process of producing high antiknock branched chain paraffinic hydrocarbons boiling within the gasoline boiling range which comprises alkylating isoparaffinic hydrocarbons, lower boiling than gasoline components, with olefinic hydrocarbons, also lower boiling than gasoline components, in contact under alkylating conditions with a catalyst capable of effecting said alkylation comprising concentrated sulfuric acid and an amount of a mono-butyl pyrophosphoric acid sufficient to materially alter the catalytic activity of the sulfuric acid in the direction of producing alkylate of higher octane number but less than about 25% by weight of the catalyst.

10. Process of producing high antiknock branched chain paraffinic hydrocarbons boiling within the gasoline boiling range which comprises alkylating isoparaffinic hydrocarbons, lower boiling than gasoline components, with olefinic hydrocarbons, also lower boiling than gasoline components, in contact under alkylating conditions with a catalyst capable of effecting said alkylation comprising concentrated sulfuric acid and an amount of a mono-tertiary butyl pyrophosphoric acid sufficient to materially alter the catalytic activity of the sulfuric acid in the direction of producing alkylate of higher octane number but less than about 25% by weight of the catalyst.

11. Process of producing high antiknock branched chain paraffinic hydrocarbons boiling within the gasoline boiling range which comprises alkylating isoparaffinic hydrocarbons, lower boiling than gasoline components, with olefinic hydrocarbons, also lower boiling than gasoline components, in contact under alkylating conditions with a catalyst capable of effecting said alkylation comprising concentrated sulfuric acid and between about 5 to 20% of a mono-butyl pyrophosphoric acid.

12. Process of producing high antiknock branched chain paraffinic hydrocarbons boiling within the gasoline boiling range which comprises alkylating isoparaffinic hydrocarbons, lower boiling than gasoline components, with olefinic hydrocarbons, also lower boiling than gasoline components, in contact under alkylating conditions with a catalyst capable of effecting said alkylation comprising concentrated sulfuric acid and between about 5 and 20% of a mono-tertiary butyl pyrophosphoric acid.

13. Process of producing high antiknock branched chain paraffinic hydrocarbons boiling within the gasoline boiling range which comprises alkylating isobutane with isobutene by means of a catalyst comprising concentrated sulfuric acid and an amount of butyl pyrophosphoric acid sufficient to materially alter the catalytic activity of the sulfuric acid in the direction of producing alkylate of higher octane number but less than about 25% by weight of the catalyst.

14. Process of producing high antiknock branched chain paraffinic hydrocarbons boiling within the gasoline boiling range which comprises alkylating isobutane with isobutene by means of a catalyst comprising concentrated sulfuric acid and an amount of a mono-tertiary butyl pyrophosphoric acid sufficient to materially alter the catalytic activity of the sulfuric acid in the direction of producing alkylate of higher octane number but less than about 25% by weight of the catalyst.

15. A catalyst for the alkylation of isoparaffinic hydrocarbons with olefinic hydrocarbons which comprises sulfuric acid of about 100% concentration, which tends to oxidize hydrocarbons involved in the alkylation reaction to produce substances which poison the sulfuric acid as an alkylation catalyst, and a nonaqueous, sulfuric acid miscible compounding and diluting agent comprising an effective amount of an alkyl derivative of an oxy-acid of phosphorus, which reduces the oxidizing effect of said sulfuric acid with substantially no impairment of its effectiveness to alkylate isoparaffinic hydrocarbons with olefinic hydrocarbons.

16. A catalyst for the alkylation of isoparaffinic hydrocarbons with olefinic hydrocarbons which comprises sulfuric acid of about 100% concentration, which tends to oxidize hydrocarbons involved in the alkylation reaction to produce substances which poison the sulfuric acid as an alkylation catalyst, and a nonaqueous, sulfuric acid miscible compounding and diluting agent comprising an effective amount of a butyl ester of pyrophosphoric acid, which reduces the oxidizing effect of said sulfuric acid with substantially no impairment of its effectiveness to alkylate isoparaffinic hydrocarbons with olefinic hydrocarbons.

17. A catalyst for the alkylation of isoparaffinic hydrocarbons with olefinic hydrocarbons which comprises sulfuric acid of about 100% concentration, which tends to oxidize hydrocarbons involved in the alkylation reaction to produce substances which poison the sulfuric acid as an alkylation catalyst, and a nonaqueous, sulfuric acid miscible compounding and diluting agent comprising an effective amount of a mono-tertiary butyl ester of pyrophosphoric acid, which reduces the oxidizing effect of said sulfuric acid with substantially no impairment of its effectiveness to alkylate isoparaffinic hydrocarbons with olefinic hydrocarbons.

18. A catalyst for the alkylation of isoparaffinic hydrocarbons with olefinic hydrocarbons which comprises sulfuric acid of about 100% concentration, which tends to oxidize hydrocarbons involved in the alkylation reaction to produce substances which poison the sulfuric acid as an alkylation catalyst, and a nonaqueous, sulfuric acid miscible compounding and diluting agent comprising an effective amount but less than about 25% of the mono-tertiary butyl ester of pyrophosphoric acid, which reduces the oxidizing effect of said sulfuric acid with substantially no impairment of its effectiveness to alkylate isoparaffinic hydrocarbons with olefinic hydrocarbons.

19. The process which comprises alkylating isoparaffinic hydrocarbons with olefinic hydrocarbons in contact under alkylating conditions with a catalyst comprising concentrated sulfuric acid modified with an alkyl derivative of an oxy-acid of phosphorus, said catalyst containing less than 10% of water.

EUGENE H. OAKLEY.
LLOYD F. BROOKE.